E. SCHNEIDER, DEC'D.
S. SCHNEIDER, ADMINISTRATRIX.
FILM MENDING APPARATUS.
APPLICATION FILED MAY 11, 1918.
1,310,215.
Patented July 15, 1919.
3 SHEETS—SHEET 1.
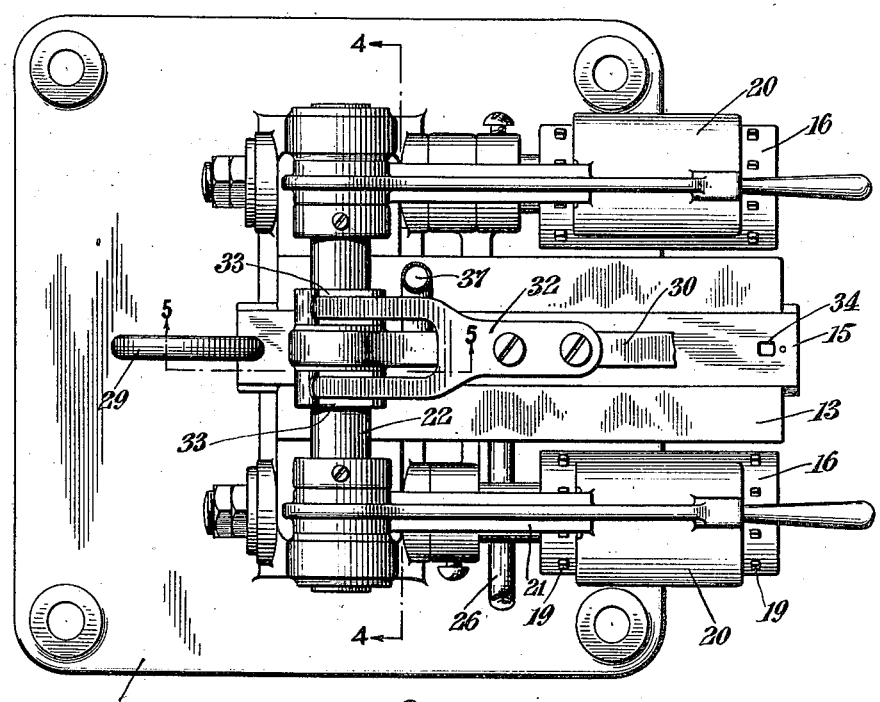
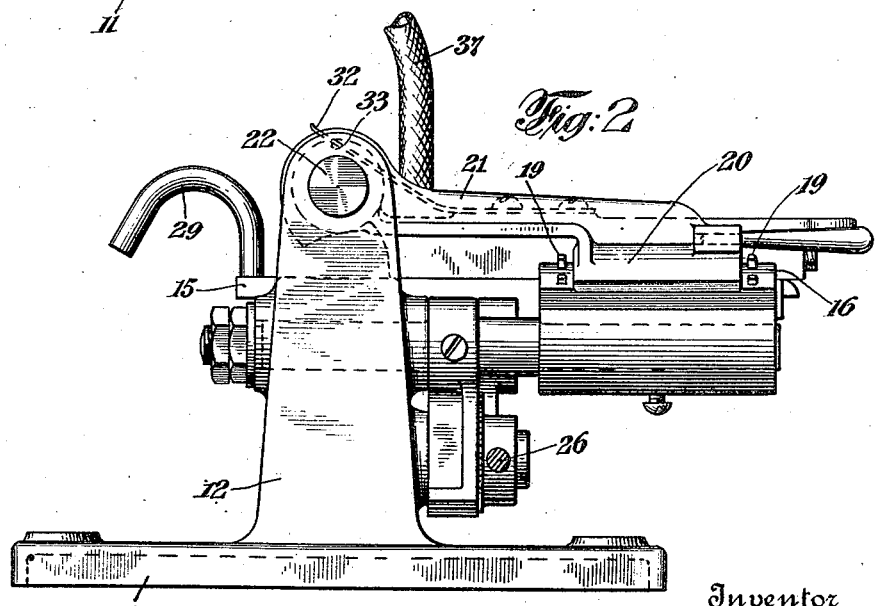
Inventor
Eberhard Schneider
By his Attorney E. SCHNEIDER, DEC'D.
S. SCHNEIDER, ADMINISTRATRIX.
FILM MENDING APPARATUS.
APPLICATION FILED MAY 11, 1918.
1,310,215.
Patented July 15, 1919.
3 SHEETS—SHEET 2.
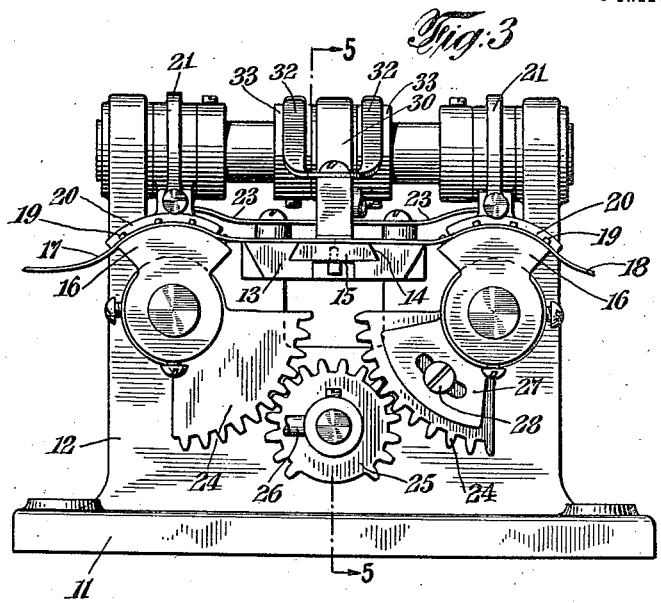
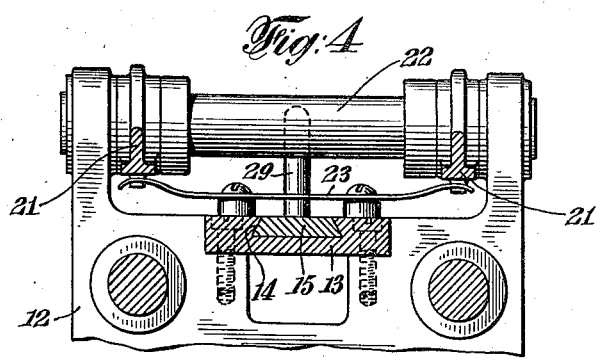
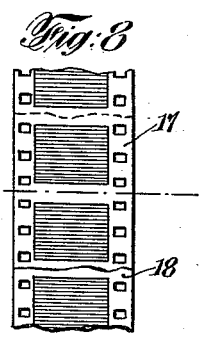
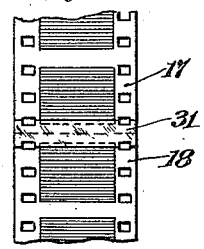
Inventor
Eberhard Schneider
By his Attorney

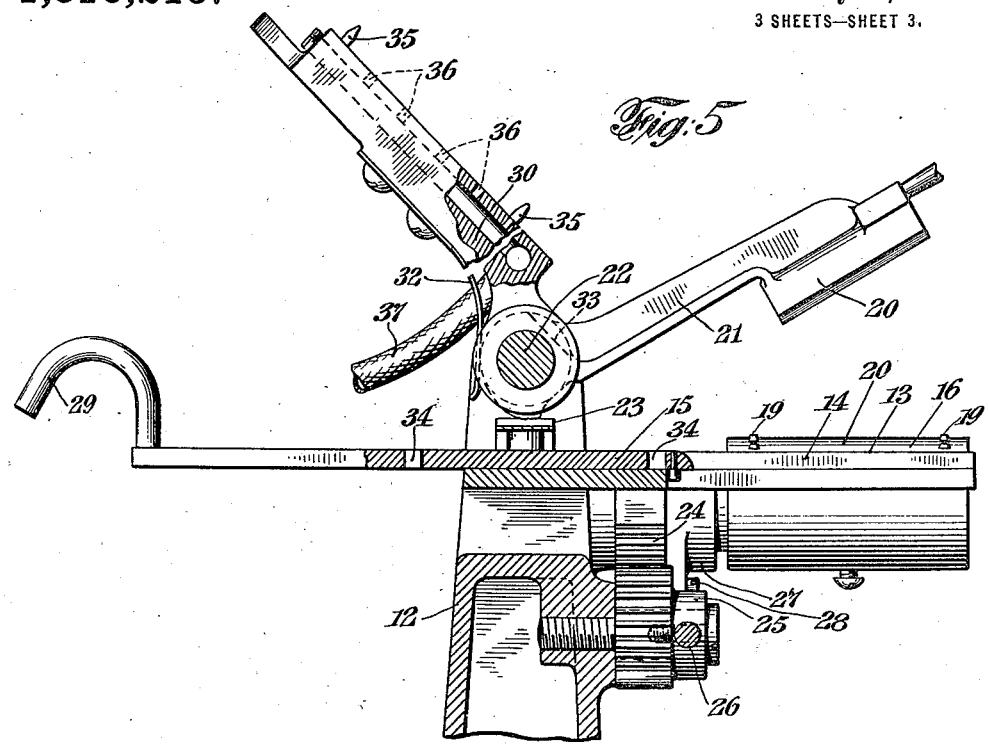
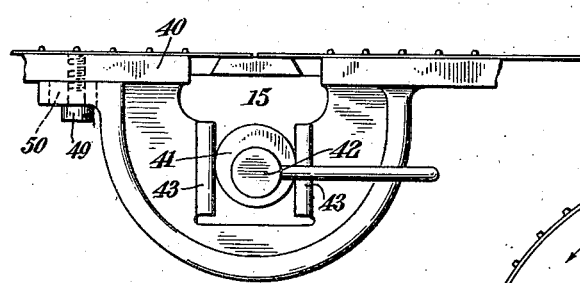
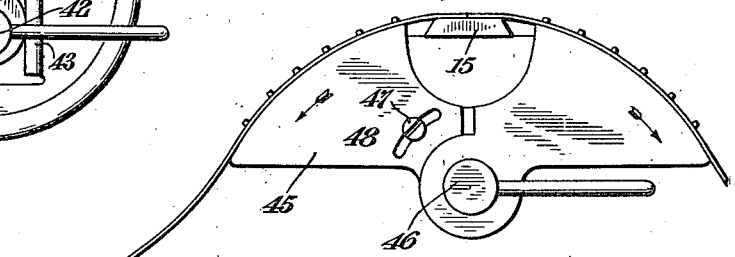

UNITED STATES PATENT OFFICE.

EBERHARD SCHNEIDER, OF NEW YORK, N. Y.; STANISLAWA SCHNEIDER ADMINISTRATRIX OF SAID EBERHARD SCHNEIDER, DECEASED.

FILM-MENDING APPARATUS.

1,310,215.    Specification of Letters Patent.    Patented July 15, 1919.

Application filed May 11, 1918. Serial No. 233,828.

*To all whom it may concern:*

Be it known that I, EBERHARD SCHNEIDER, a citizen of the United States, and a resident of New York, in the county of New York and State of New York, have invented certain new and useful Improvements in Film-Mending Apparatus, of which the following is a specification.

The invention relates to apparatus adapted for the mending or uniting of strips of material, particularly such as the celluloid films employed in the taking and projection of motion pictures. It has for its object to provide a device of this character whereby the mending of the film may be simply and rapidly effected and with great accuracy. The operation is accomplished in such manner that no marring or soiling of the film occurs, and without first scraping off a portion of the emulsion from an end of the film, as has been the practice heretofore, to effect a lap joint.

The nature of the invention will be best understood when described in connection with the accompanying drawings, in which—

Figure 1 is a plan of the apparatus with the various parts in operative position for uniting the film ends.

Fig. 2 is a side elevation.

Fig. 3 is a front elevation with film portions in position.

Fig. 4 is a transverse section taken on the line 4—4, Fig. 1, with parts omitted.

Fig. 5 is a vertical section taken on the line 5—5, Fig. 3, with the operative parts in raised position.

Figs. 6 and 7 are detail fragmentary views illustrating modifications in the film-adjusting mechanism.

Figs. 8, 9 and 10 are diagrammatic views of film lengths and mending strip, illustrating the manner of uniting the ends of the film.

Similar characters of reference designate corresponding parts throughout the several views.

Referring to the drawings, 11 designates a suitable bed plate or table upon which the mechanism is mounted, the latter being retained by a frame 12. From this frame extends a horizontal table 13 formed of two side pieces rigidly mounted and formed along their inner sides with ways 14 for a movable table portion or slide 15. It is to be understood that this movable portion may be variously mounted with reference to said fixed portions of the table, the object of the same being to complete, at certain times, the table surface, and at other times, to afford a free space between the side portions of the table thus formed, as shown respectively in Figs. 1 and 5. Upon each side of said table are provided film retaining means, for example, segmental film sprockets 16 to receive the ends of the film portions 17 and 18 which are to be united. These sprockets have coöperating therewith and between the sprocket teeth 19 thereof, cylindrical plates 20 which are carried by arms 21 rotatably mounted on a shaft 22 located transversely to and above the table 13 in the frame 12. A spring member 23 is designed to engage the inner ends of these arms to provide the necessary tension thereon when plates 20 are over the film, as shown in Figs. 1 to 4.

The sprockets themselves are secured to shafts rotatably mounted in the frame 12 and carry segmental gears 24, which are engaged by a pinion 25 also rotatably mounted on said frame and adapted to be oscillated by a suitable lever 26 to effect a limited rotation of the said sprockets, the mounting being such that both sprockets move in the same direction when actuated by the lever 26. One of the gears 24, moreover, may be adjustably secured, as shown in Fig. 3, to its shaft by including a slotted plate 27, fixed to said shaft and through which passes a screw 28 designed to secure said gear to the plate and thereby to the corresponding sprocket shaft. In this manner, slight variations in the film perforation spacing may be accommodated for in using the apparatus.

The slide 15 may be withdrawn in any convenient manner; and, as herein shown, by having secured thereto a suitable finger piece or hook 29. Immediately above the said slide and designed to coöperate with same, and accurately located with respect thereto, is a carrier 30 designed to receive the mending strip 31 by which the two ends of the film are to be united. This carrier is mounted to oscillate upon the shaft 22, and carries a bifurcated spring member 32 whose two arms engage squared surfaces 33 of the shaft to snap and lock the carrier in position on the slide 15. The latter also may be provided with suitable sockets 34 outside the film receiving portion, and the carrier with pins 35, to accurately register the position of the one with reference to the other.

The mending strip 31 is designed to be applied to the carrier when the same is in raised position, and may be held thereto in any convenient manner. For example, and as herein shown, openings 36 are provided in the operative face of the carrier, and communicate, for example, through a suitable hose connection 37, with a vacuum pump or like device (not shown) which affords a slight suction, sufficient to retain the small mending strip to the said carrier until the same is brought down over the slide by depressing the said carrier.

In Figs. 6 and 7, a modified form of table is illustrated, the table for receiving the film being adjustable as a unit in either direction, for example, as shown in Fig. 6, table 40 is reciprocable by means of an eccentric 41 mounted upon an actuating shaft 42. This eccentric contacts with the walls 43 of a depressed portion of the table; and as the shaft 42 is turned in one direction or the other, the said table 40 is correspondingly reciprocated, being guided in its movement in any well-known manner. In Fig. 7, the table is shown as a portion of the surface of a cylinder 45 mounted to rock upon a shaft 46. The table surface, or rather a portion thereof, is preferably also made adjustable, in the latter case, by means of a screw 47 extending through a slot 48 of said cylindrical member 45, and in the former by means of a screw 49 extending through a slot 50.

In uniting the two film portions 17 and 18, reference being had more particularly to Figs. 8 to 10 of the drawings, the broken ends are secured upon the sprocket teeth 19 to overlap, with the images matching and with their perforations registering. A cut is then made as along the broken line, Fig. 8, preferably to separate the two films midway of the images, the slide 15 having been withdrawn for this purpose. The slide 15 is then returned to complete the table surface, and the line of contact between the two film ends properly centered with reference to said slide by adjusting the table, as hereinbefore set forth; whereupon, the mending strip 31, which consists, as shown in Fig. 9, of a piece of celluloid film without any emulsion whatsoever thereon and cut preferably along the middle of two succeeding perforations, is applied to the carrier 30. A suitable adhesive, such as collodion, is applied over the abutting film ends, and the carrier with mending strip brought down over same; and, under the pressure of spring 32, allowed to remain in position for a sufficient period to enable the strip to secure an adequate hold. The mended film, Fig. 10, is then removed from the table by raising the carrier 30 and the cylindrical holding plates 20.

I claim:

1. In film mending apparatus: means to receive and retain the overlapping ends of the film portions to be united; a table over which the said overlapping ends extend; a slide forming a portion of said table and removable from an active portion thereof to provide a free space to permit the cutting of the two film ends simultaneously after they are positioned on the table; and means to apply a film mending strip to the abutting portions of the cut ends.

2. In film mending apparatus: a pair of film sprockets to receive the overlapping ends of the film portions to be united; means to retain the film portions thereon; a table over which the said overlapping ends extend; a slide forming a portion of said table and removable from an active portion thereof to provide a free space to permit the cutting of the two film ends simultaneously after they are positioned on the table; and means to apply a film mending strip to the abutting portions of the cut ends.

3. In film mending apparatus: a pair of film sprockets to receive the overlapping ends of the film portions to be united; curved plates adapted to fit between the teeth of the respective sprockets to retain the film portions in position thereon; a table over which the said overlapping ends extend; a slide forming a portion of said table and removable from an active portion thereof to provide a free space to permit the cutting of the two film ends simultaneously after they are positioned on the table; and means to apply a film mending strip to the abutting portions of the cut ends.

4. In film mending apparatus: means to receive and retain the overlapping ends of the film portions to be united; a table over which the said overlapping ends extend; a slide forming a portion of said table and removable from an active portion thereof to provide a free space to permit the cutting of the two film ends simultaneously after they are positioned on the table, said slide being provided with sockets; a movable carrier adapted to be brought over said table to coöperate with said slide and adapted to retain a suitable mending strip; and suitable pins carried by the said carrier to register with said sockets and positively locate the position of the carrier with reference to the table.

5. In film mending apparatus: means to receive and retain the overlapping ends of the film portions to be united; a table over which the said overlapping ends extend; a slide forming a portion of said table and removable from an active portion thereof to provide a free space to permit the cutting of the two film ends simultaneously after they are positioned on the table; and a movable carrier adapted to be brought over said table to coöperate with said slide, and provided with suction openings in its surface, whereby a suitable film mending strip may be held thereto when suction is applied.

6. In film mending apparatus: a frame; a pair of film sprockets rotatably mounted in said frame to receive the overlapping ends of the film portions to be united; a shaft mounted in the frame transversely to the axes of said sprockets; curved plates adapted to fit between the teeth of the respective sprockets to retain the film portions in position thereon; tensioned arms movably mounted on said shaft to which said plates are secured; a table between said sprockets, over which the said overlapping ends extend; a slide forming a portion of said table and removable from an active portion thereof to provide a free space to permit the cutting of the two film ends simultaneously after they are positioned on the table; and a tensioned carrier movably mounted on said shaft to be brought over said table to coöperate with said slide, and adapted to retain a suitable mending strip.

Signed at New York in the county of New York and State of New York this 9th day of May, A. D. 1918.

EBERHARD SCHNEIDER.